(12) United States Patent
Migitaka et al.

(10) Patent No.: US 7,435,471 B2
(45) Date of Patent: *Oct. 14, 2008

(54) INDICATOR PANEL AND METHOD OF MANUFACTURING THE SAME

(75) Inventors: Yukinori Migitaka, Kasugai (JP); Teruhiko Iwase, Nagoya (JP); Kazuo Kato, Nagoya (JP); Takashi Aoki, Toyoake (JP)

(73) Assignee: Denso Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/528,392

(22) Filed: Sep. 28, 2006

(65) Prior Publication Data

US 2007/0071917 A1    Mar. 29, 2007

(30) Foreign Application Priority Data

Sep. 28, 2005    (JP)    ............................. 2005-281674

(51) Int. Cl.
*B41M 5/00*    (2006.01)

(52) U.S. Cl. .................... 428/195.1; 428/192; 428/156; 428/162; 428/161; 116/256; 347/1

(58) Field of Classification Search .............. 428/195.1; 359/885; 362/29
See application file for complete search history.

(56) References Cited

U.S. PATENT DOCUMENTS

| | | | | |
|---|---|---|---|---|
| 2,959,880 A | * | 11/1960 | Detloff | ........................ 40/443 |
| 5,247,429 A | * | 9/1993 | Iwase et al. | .................... 362/29 |
| 5,484,502 A | * | 1/1996 | Bozanic | ....................... 156/235 |
| 6,225,369 B1 | * | 5/2001 | Jeon | ............................. 522/81 |
| 6,663,252 B1 | * | 12/2003 | Fong et al. | ..................... 362/29 |
| 6,856,478 B1 | * | 2/2005 | Miyanishi et al. | ........... 359/885 |
| 6,857,737 B2 | * | 2/2005 | Emslander et al. | .......... 347/105 |
| 6,976,915 B2 | * | 12/2005 | Baker et al. | .................... 463/1 |
| 2002/0096064 A1 | * | 7/2002 | Fissell | ........................ 101/114 |
| 2005/0031973 A1 | * | 2/2005 | Kobayashi et al. | ............. 430/7 |

FOREIGN PATENT DOCUMENTS

| | | |
|---|---|---|
| JP | 60-159319 | 10/1985 |
| JP | 8-21749 | 1/1996 |
| JP | 2002-156252 | 5/2002 |
| JP | 3493606 | 11/2003 |
| JP | 2005-321343 | 11/2005 |

\* cited by examiner

*Primary Examiner*—Bruce Hess
*Assistant Examiner*—Tamra L. Dicus
(74) *Attorney, Agent, or Firm*—Nixon & Vanderhye PC

(57) ABSTRACT

An indicator panel is shaped by thermoforming an indicator panel. The indicator panel includes a resin substrate and an inkjet design film on the substrate. The design film is formed by printing a UV hardening ink in an inkjet printing, and hardening. A crack and a removal of the design film can be decreased such that the formed indicator panel can have a high-quality design.

15 Claims, 9 Drawing Sheets

FIG. 14

| STRETCHING RATE (SR) | EXPRESSIBLE DESIGN | STEREOSCOPIC EFFECT |
|---|---|---|
| 0% | FLAT | C |
| 0%<SR<20% | ALMOST FLAT | C |
| 20%≦SR<50% | SLIGHT CONVEX AND CONCAVE | B |
| 50%≦SR<100% | CONVEX | A |
| 100%≦SR | CONVEX HAVING 10mm OR MORE HEIGHT | AA |

FIG. 15

| HEAD RESOLUTION (DPI) | NUMBER OF PASS | APPEARANCE |
|---|---|---|
| 150 | 4 | A |
| 300 | 2 | B |
| 600 | 1 | C |

INDICATOR PANEL AND METHOD OF MANUFACTURING THE SAME

CROSS REFERENCE TO RELATED APPLICATION

This application is based on Japanese Patent Application No. 2005-281674 filed on Sep. 28, 2005, the disclosure of which is incorporated herein by reference in its entirety.

BACKGROUND OF THE INVENTION

1. Field of the Invention

The present invention relates to an indicator panel having an inkjet design film on a resin substrate, and a method of manufacturing the indicator panel.

2. Description of Related Art

Conventionally, an indicator device, e.g., an instrument panel, is provided in a vehicle. Generally, the indicator device includes a panel and a light source. The panel includes a design portion having scales and letters, and the light source is provided at a backside of the panel. In the panel, the design portion except for the scales and the letters is made of an opaquex portion, in which a light is not transmitted. The scales and the letters are made of a translucent portion, in which a light is transmitted. Thereby, the translucent portion, e.g., the scales and the letters, can be displayed clearly by illuminating the panel with the light source at night. Moreover, because a high-quality appearance, visibility and texture are required for the instrument panel, e.g., automobile meter panel, the panel is thermoformed in a stereoscopic shape.

The indicator panel is usually manufactured by printing the opaque portion (solid concealing image portion) on a surface of a transparent substrate made of resin, e.g., polycarbonate, in a screen-printing. The screen-printing is a printing method, in which ink is printed on a substrate through a screen after an image from print data is drawn on the screen. The screen-printing has an advantage that a dark opaque portion can be printed at one time.

Further, in the screen-printing, a solvent drying type ink or heat hardening type ink is mainly used. Because the screen-printing is a monochromatic printing, multilayer printings using different color inks are required for forming a multicolored design. In this case, a process number and a process time for the screen-printing are increased. Furthermore, in the screen-printing, a design is restricted because an accuracy of a printing position and a resolution are generally low.

JP-U-60-159319 and JP-A-8-21749 disclose a stereoscopic indicator panel for the automobile meter panel, in which a predetermined part, e.g., dial, is protruded from the other part by a thermal drawing process, e.g., pressing process. However, a strict deforming control is required, because an accuracy defect and a variation in brightness are generated due to a slight displacement. Therefore, a time and a cost for the manufacturing are increased, because a number of formings and testings of the screens are needed for positioning adjustments.

Except for the screen-printing, a digital printing method such as a laser printing, an electrophotography printing, a thermoelectric printing and an inkjet printing is used in other fields, e.g., office automation printer field. These printings can perform a direct printing on the resin substrate without forming the screen. Thus, these printings may be better for a small lot printing than the screen-printing.

Among the digital printing methods, the inkjet printing rapidly becomes common in the office automation printer field, because the initial cost is low and the resolution is high due to a simple structure. The inkjet printing is performed by jetting ink from a computerized head nozzle.

JP-A-2002-156252 discloses an indicator panel for a display device, in which the panel is formed by the inkjet printing on a translucent substrate made of resin. U.S. Pat. No. 6,856,478 (corresponding to JP-2004-A-286459) discloses an indicator panel, in which an ink receiving layer and a light shielding printed layer are laminated on a substrate by the inkjet printing. The indicator panel formed by the inkjet printing has a high resolution such that a sharp and clear design can be formed on the panel. Thus, the indicator panel having a high-quality design can be manufactured.

However, when the indicator panel having an ink film produced by the inkjet printing is further thermoformed so as to be shaped, the high-quality design with the inkjet printing may be easily damaged. For example, a crack and a removal of the ink film are generated. Therefore, the thermoformed indicator panel may not practically used.

SUMMARY OF THE INVENTION

In view of the foregoing and other problems, it is an object of the present invention to provide an indicator panel having a high-quality design. It is another object to provide a method of manufacturing a shaped indicator panel, in which a crack and a removal of an ink film can be reduced.

According to a first example of the present invention, an indicator panel includes a resin substrate and an inkjet design film on the substrate. The design film is made of a UV hardening ink that is hardened after being inkjet-printed on the resin substrate. The resin substrate and the inkjet design film are shaped by thermoforming to have a shaped plate portion.

According to a second example of the present invention, a method of manufacturing an indicator panel includes a forming process in which an inkjet design film is formed on a resin substrate, and a thermoforming process in which the substrate with the design film is thermoformed after the design film is formed, so as to form a shaped design plate. The forming of the inkjet design film includes a jetting step in which droplets of a UV hardening ink are jetted on the substrate by repeating through an inkjet printing, and a hardening step in which the jetted ink is hardened by radiating ultraviolet rays for a time.

According to a third example of the present invention, a method of manufacturing an indicator panel includes a forming process in which a half-hardened inkjet design film is formed on a resin substrate, a thermoforming process in which the substrate with the half-hardened design film is thermoformed after the half-hardened design film is formed, and a hardening process in which the half-hardened inkjet design film is hardened by radiating ultraviolet rays after the thermoforming so as to form a shaped design plate. The forming of the half-hardened inkjet design film includes a jetting step in which droplets of a UV hardening ink are jetted on the substrate by repeating through an inkjet printing, and a hardening step in which the jetted ink is hardened by radiating ultraviolet rays for a time.

Accordingly, in the first, second or third embodiment, a crack and a removal of the design film can be decreased such that the formed indicator panel can have a high-quality design.

BRIEF DESCRIPTION OF THE DRAWINGS

The above and other objects, features and advantages of the present invention will become more apparent from the following detailed description made with reference to the accompanying drawings. In the drawings:

FIG. 14 is a view showing evaluation results of a stereoscopic effect due to a stretching rate; and FIG. 15 is a view showing a relationship between a pass number of an inkjet printing and an appearance of an inkjet design film.

DETAILED DESCRIPTION OF PREFERRED EMBODIMENT

Figure 1:
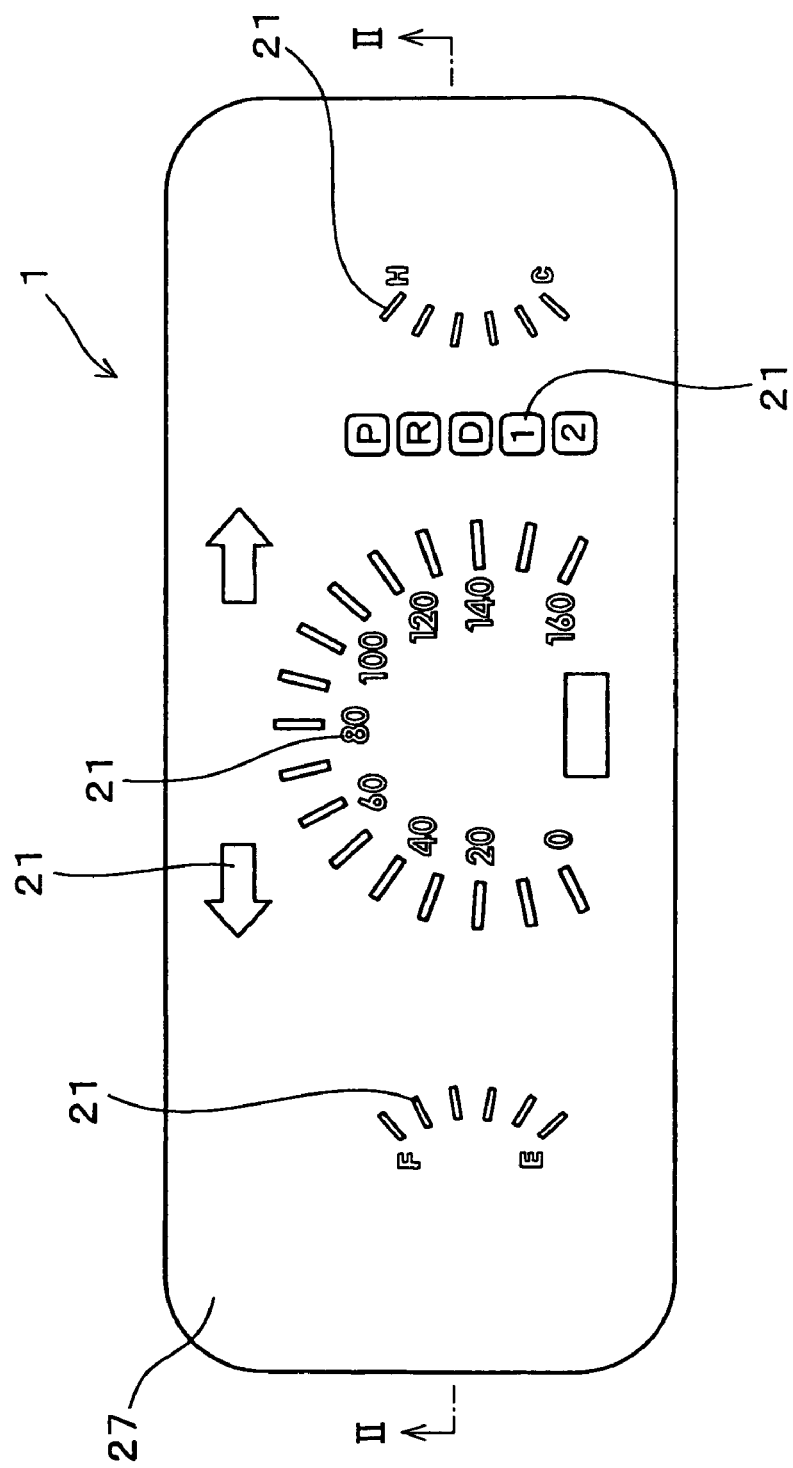
FIG. 1 is a front view of an indicator panel according to an embodiment.
Figure 2:
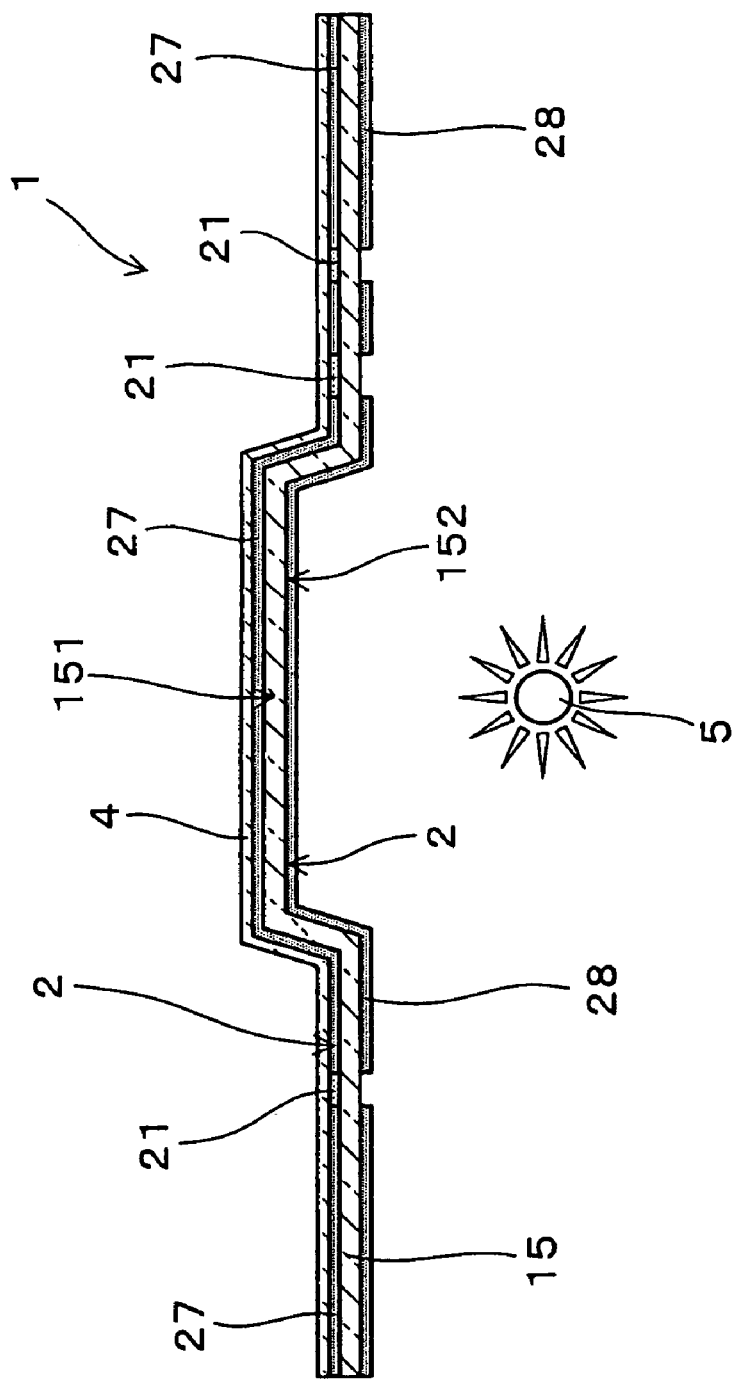
FIG. 2 is a cross-sectional view of the indicator panel taken along line II-II in FIG. 1 according to the embodiment.
Figure 13:
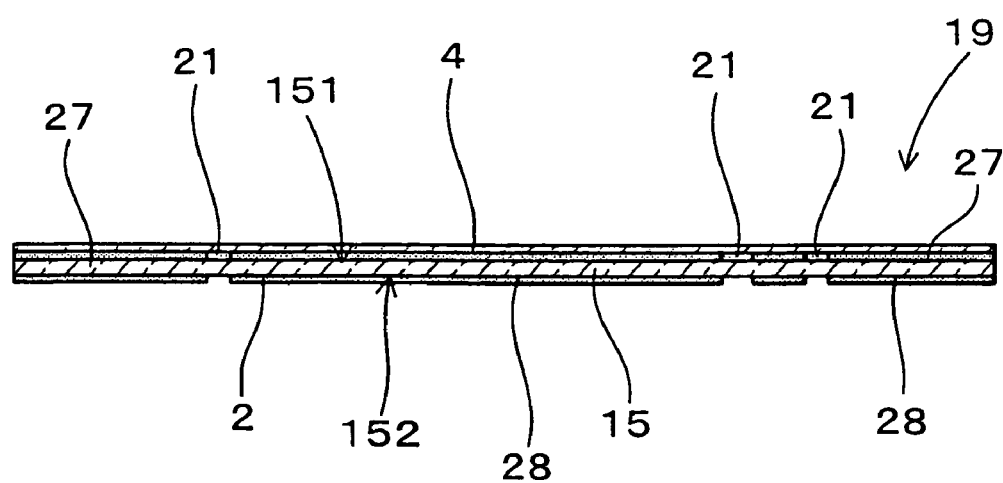
FIG. 13 is a cross-sectional view of an indicator panel portion before thermoforming.

A formed indicator panel 1 in an embodiment shown in FIGS. 1, 2 is shaped by thermoforming an indicator panel portion 19 shown in FIG. 13. The indicator panel portion 19 includes a resin substrate 15 and an inkjet design film 2 on the substrate 15. The design film 2 is formed by printing a UV hardening ink in an inkjet printing, and hardening.

As shown in FIGS. 1, 2, the shaped indicator panel 1 can be used for a meter dial for an automobile instrument device (display device) in this embodiment. The panel 1 includes the translucent resin substrate 15 and the inkjet design film 2. The film 2 is layered on a design face 151 of the substrate 15. The film 2 is made of the UV hardening ink or a mixture of the inks. For example, the inks are colored in clear (transparent), black, white, magenta, cyan, yellow, light cyan and light magenta.

In the panel 1, a translucent portion 21 and an opaque portion 27 are formed. When a light is illuminated to a back face 152 of the substrate 15 opposite to the design face 151, the visible light can be transmitted through the translucent portion 21, but not through the opaque portion 27. The translucent portion 21 can be formed in a predetermined color by mixing the inks. As shown in FIG. 1, a scale for a fuel quantity, an arrow for indicating a direction, a scale for a speed meter and a gear indicator are provided as the translucent portions 21. Further, the translucent portion 21 can be displayed clearly in a dark place by illuminating a light from a light source 5 disposed at a backside of the panel 1.

The opaque portion 27 is formed of the design film 2 using the black ink. Further, as shown in FIG. 2, the opaque portion 27 of the design film 2 is formed on the design face 151, and an opaque portion 28 of the design film 2 is formed on the back face 152 of the substrate 15. An acrylic radical polymerization ink and an epoxy cationic polymerization ink can be used as the UV hardening ink, for example.

Further, the panel 1 includes a transparent overcoat layer 4, which covers the design film 2 on the design face 151. Moreover, the panel 1 has a convex structure protruded toward the face side approximately at a center part, as shown in FIG. 2.

Next, a manufacturing method of the indicator panel 1 will be described with reference to FIGS. 1, 2 and 13. A design image, e.g., shown in FIG. 1 is set by a computer, and the image is printed on the substrate 15 by the inkjet method using the UV hardening inks in full colors. Then, the ink is hardened so as to form the panel portion 19.

In the embodiment, following devices are used for manufacturing the indicator panel portion 19. For example, an image-processing software made by Adobe Inc. is used for forming the image. For example, an UV hardening type inkjet apparatus (inkjet head, light source for UV radiating simultaneous driving type UJF605C made by MIMAKI Engineering, maximum resolution of 1200 DPI, CMYKKKWW, 8 heads attached) is used as a printing machine.

A light source for radiating ultraviolet rays is mounted beside the inkjet head in the printing machine. After ink droplets are jetted from a head nozzle, ultraviolet rays can be radiated to the droplets.

Specifically, the panel 19 can be manufactured as described below. Firstly, after an image is drawn by a computer, the image data is input from the computer into the printing machine. At this time, a resolution, a droplet volume, a color and a halftone dot rate in each of the ink layers 21, 27 and 28 can be specified. Then, the resin substrate 15 made of polycarbonate is prepared. Droplets of the UV hardening colored ink are printed by the printing machine at a predetermined position where the translucent portion 21 and the opaque portion 27 will be formed, and hardened by radiating ultraviolet rays. In the embodiment, the volume of the droplets is equal to or less than 30 pl, and the droplets are hardened by radiating ultraviolet rays within one second from the jetting. The design film 2 is formed on the design face 151 of the substrate 15 by repeating the jetting and the radiating.

Also, the design film 2 is formed on the back face 152 of the substrate 15 by a similar inkjet apparatus. The opaque portion 28 of the design film 2 on the back face 152 is formed by using only the black ink.

Then, the transparent overcoat layer 4 is printed on the design film 2 on the design face 151 of the substrate 15 by a silkscreen printing. Accordingly, the indicator panel portion 19 before thermoforming shown in FIG. 13 can be manufactured, in which the design film 2 is formed on both the design face 151 and the back face 152, and the overcoat layer 4 is layered on the design film 2 on the design face 151.

Next, a thermal drawing process, e.g., pressing, is performed to the indicator panel 19 at the temperature of 150-180° C. Thus, the speed meter scale approximately in the center part of the indicator panel 19 is formed to be protruded at the side of the design face 151. Accordingly, the formed indicator panel 1 shown in FIGS. 1, 2 can be manufactured. By placing the panel 1 together with an indicating needle (not shown), a rotating machine (not shown) and the light source 5 into a housing including a casing and a facing board, the automobile instrument device can be manufactured.

According to the embodiment, the design film 2 can be formed by printing the ink in the inkjet printing, and hardening. The UV hardening ink generally includes little of a volatile component and much of a binder component, because the ink can be hardened by the UV radiating. The binder component can enhance a thermoforming property. Moreover, the ink for the inkjet printing generally has a low viscosity and a high adhesion property compared with that for the screen-printing. Therefore, a crack and a removal of the design film 2 can be reduced such that the high-quality design property can be maintained.

Figure 5:
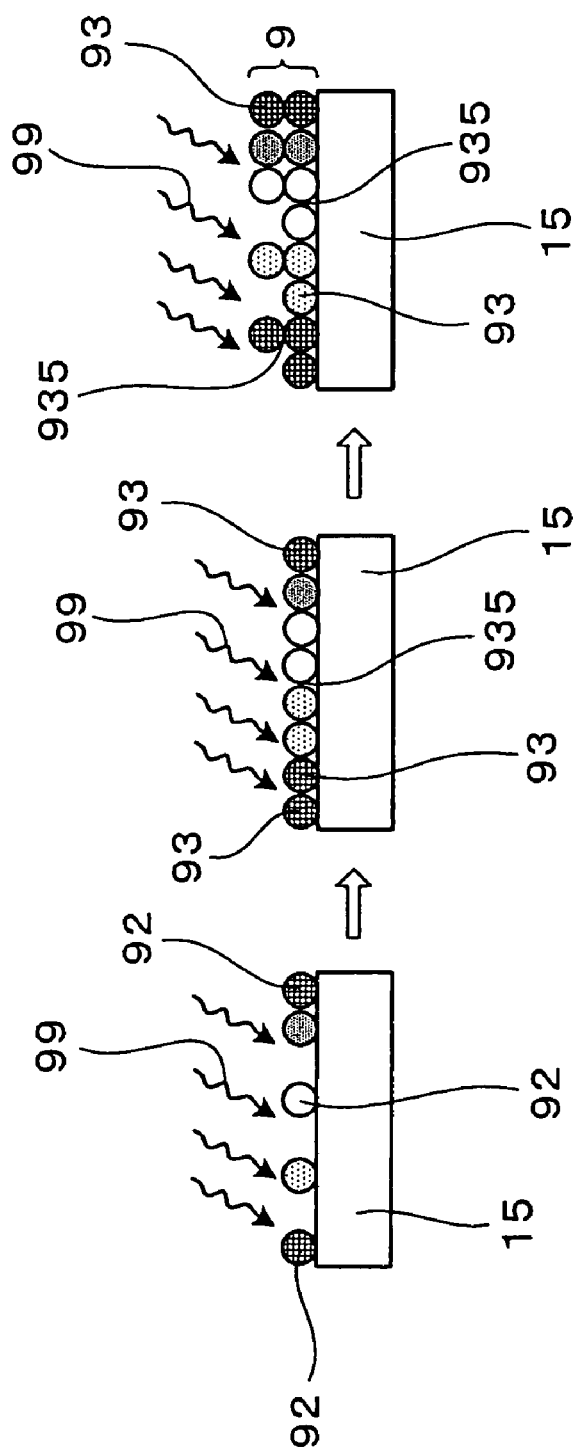
FIG. 5 is a schematic cross-sectional view showing a method of forming an ink film according to the embodiment.

Further, according to the embodiment, the design film 2 can be formed by repeating the printing process and the radiating process, in which the droplets of the UV hardening ink are jetted and hardened. Therefore, the design film 2 is formed of a mass 9 of the hardened droplets 93 shown in FIG. 5. The hardened droplets 93 adjacent to each other are in contact with each other so as to form a contact interface 935, as shown in FIG. 5. Accordingly, a transudation and a protrusion of the ink can be reduced such that the design film 2 can be formed in sharp.

The above-described embodiment is only an example for the indicator panel 1. It is to be noted that various changes and modifications will be become apparent to those skilled in the art. For example, the UV hardening ink may include a colored pigment, a monofunctional monomer, a polyfunctional monomer, a polymerization initiator and a dispersing agent. The ink can be hardened by polymerizing the monofunctional monomers by radiating ultraviolet rays.

For example, a radical polymerization acrylate monomer may be included in the ink as the monofunctional monomer. Therefore, the adhesion between the design film 2 and the substrate 15 can be improved, and the hardening property and the transparency of the design film 2 can be improved. Further, a methoxyethyleneglycolacrylate, a 2-methoxyethylacrylate, a benzylacrylate, a tetrahydrofurfurylacrylate, an ethlycarbitolacrylate and a phenoxyethylacrylate may be used for the monofuntional monomer, for example.

The indicator panel 1 may be used in a backlight, in which the translucent portion 21 of the design film 2 can be displayed clearly by illuminating a light from the back face 152. Thus, the high-quality design property of the design film 2 can be effective. For example, the panel 1 may be used as an instrument panel in front of a driver's seat in an automobile, or a display device of an air conditioner.

The automobile instrument panel is shown in FIGS. 1, 2 as an example of the panel 1 in the backlight. In the panel 1, the translucent portion 21 is formed of the design film 2, e.g., a scale and a letter, and the design of the translucent portion 21 can be displayed clearly by a light from the light source 5 disposed at the backside of the substrate 15. The opaque portion 27 is formed of the design film 2 made of the ink in black, which is formed on the design face 151 of the substrate 15 except for the translucent portion 21.

The translucent portion 21 and the opaque portion 27 can be formed by adjusting the color concentration, the thickness and the printing density of the design film 2. For example, the color concentration, the thickness and the printing density of the design film 2 can be decreased in the translucent portion 21. In contrast, in the opaque portion 27, the thickness of the design film 2 can be increased, and the design films 2 made of the black ink can be layered.

Furthermore, the opaque portion 27 may have a visible light transmission density equal to or more than 2.0. In this case, the visible light transmission in the opaque portion 27 can be accurately reduced. The transmission density may be equal to or more than 3.0 in this embodiment. The transmission density can be measured at a room temperature using a transmission density meter, e.g., DM-500 manufactured by DAINIPPON Screen MFG. Co., Ltd. Moreover, the translucent portion 21 may have a visible light transmission density equal to or less than 1.5 so as to be displayed clearly when the panel 1 is used in the backlight.

The opaque portion 27 may be formed using only one of the UV hardening ink with a black color. In this case, an ink volume (droplets volume) for the opaque portion 27 can be reduced compared with a case in which the opaque portion 27 is formed in a combination of colors, e.g., magenta, cyan, yellow and black. Therefore, a protrusion of the droplet can be reduced, when the ink is printed in a predetermined shape. Further, the translucent portion 21 may be formed using the clear (transparent) ink. The volume of the ink and the mixing ratio of the ink in the forming material may be adjusted for the translucent portion 21. The thickness of the translucent portion 21 may be set such that a light can be transmitted through the translucent portion 21.

The design film 2 may be formed of the mass 9 of the hardened droplets 93. The hardened droplets 93 adjacent to each other may be in contact with each other so as to form the contact interface 935, as shown in FIG. 5. Thus, the design film 2 can be formed in sharp because a transudation and a protrusion of the ink can be reduced.

Figure 3:
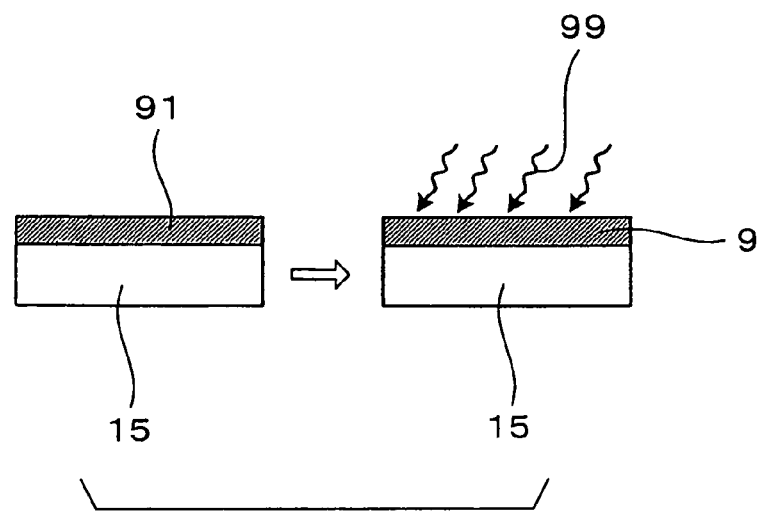
FIG. 3 is a schematic cross-sectional view showing a method of forming an ink film of a comparative example.

FIG. 3 shows a comparative example, in which the ink is printed or coated on the substrate 15 such that an ink liquid layer 91 made of the ink is formed on the substrate 15. Ultraviolet rays 99 are radiated on the ink liquid layer 91 to harden. Thus, a design film 9 made of the ink is formed on the substrate 15.

Figure 4:
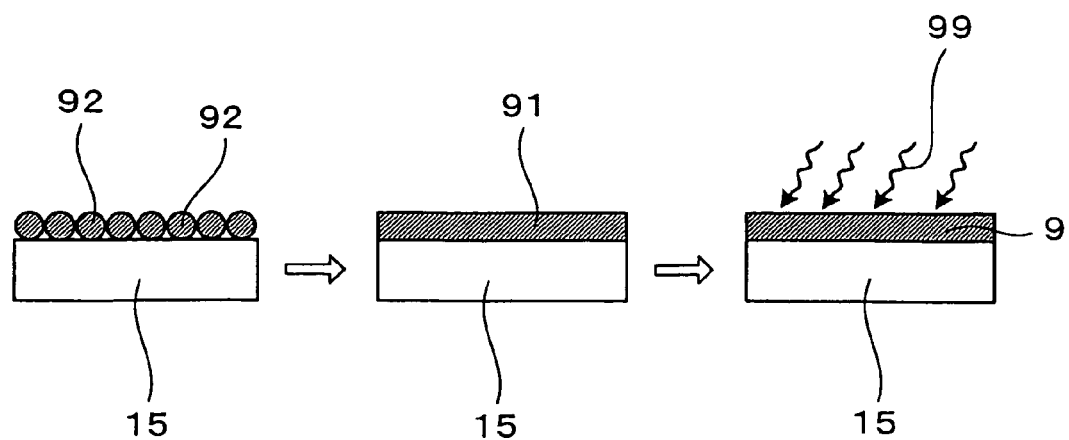
FIG. 4 is a schematic cross-sectional view showing a method of forming an ink film of a comparative example.

FIG. 4 shows another comparative example, in which droplets 92 are jetted to the substrate 15 in the inkjet printing so as to be dissolved in layer such that an ink liquid layer 91 is formed. Afterward, ultraviolet rays 99 are radiated on the ink liquid layer 91 to harden. Thus, a design film 9 is formed.

In contrast, as shown in FIG. 5, in this embodiment, the printing and the radiating are repeated such that the mass 9 of the hardened droplets 93 made of the ink is formed, and that the contact interface 935 between the droplets 93 is formed. Thus, the droplets 92 can be hardened before the droplets 92 are dissolved in each other. Accordingly, a transudation and a protrusion of the ink can be reduced such that the design film 2 made of the mass 9 can be formed in sharp. In addition, droplets 92 having different hatchings in FIG. 5 represent different colors.

The design film 2 may be formed by repeating the jetting and the hardening, in which droplets of the UV hardening ink are jetted to the substrate in the inkjet printing and ultraviolet rays are radiated for a time within one second from the jetting so as to harden the ink. Thus, the design film 2 made of the mass 9 of the hardened droplets 93 can be easily formed. Moreover, in the inkjet printing, an ink jetting method is different based on a structure of a head of an inkjet printing apparatus. For example, the inkjet printing, in which the radiating is performed within one second from the jetting as described above, has a sequential method and a concurrent method as the ink jetting method.

In the sequential method, an image (printing design) is sequentially formed in each colored layer, for example, cyan, magenta, yellow and black in sequence. In contrast, in the concurrent method, cyan, magenta, yellow and black are jetted at the same time in a single scan. The hardening characteristic in the sequential method is similar to that in a method using single ink, and the different colored inks are not in contact with each other in liquid. However, the productivity is remarkably low, because the printing time in the sequential method is four times of that in the concurrent method since the printing is performed in each single color. In contrast, in the concurrent method, the productivity is high, and the inks are restricted to be mixed because the UV hardening inks are used in this embodiment. In this embodiment, the concurrent method may be used in order to achieve a predetermined productivity. The inkjet printing can perform a full-color printing or a gradation printing at one time. Therefore, the design film 2 can be formed in fine by the inkjet printing at a lower cost compared with a silkscreen printing.

In addition, a part of the design film 2 may have a maximum stretching rate equal to or more than 50%. In this case, a crack of the design film 2, and a removal of the design film 2 from the substrate 15 can be more reduced. A stretching rate SR can be measured as described below, for example.

Figure 6:
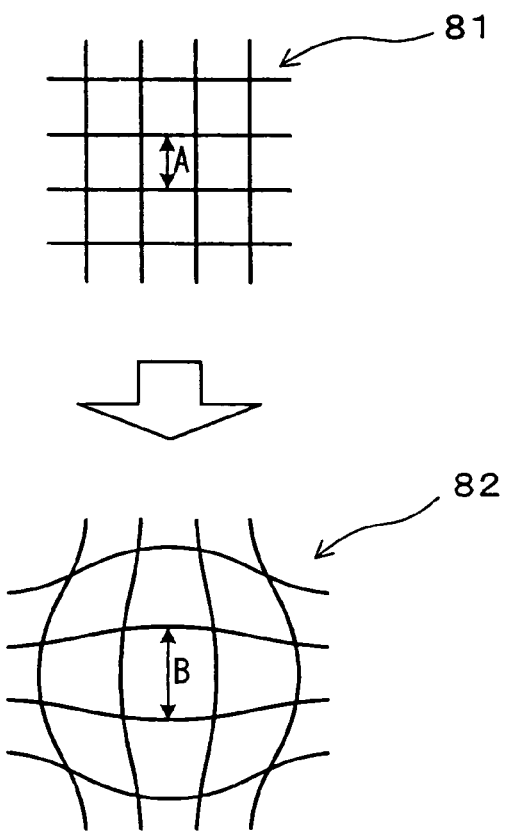
FIG. 6 is a view showing a method of measuring a stretching rate.

As shown in FIG. 6, a grid pattern inkjet film 81 having a clearance of A mm is formed on the resin substrate 15 by printing the ink in the inkjet printing and hardening. Then, the substrate 15 with the film 81 is shaped at a temperature of 120-190° C. by a vacuum forming or a pressing, for example. Here, a largest value of a clearance of a shaped grid pattern inkjet film 82 is defined as B mm. The stretching rate SR can be expressed in the following formula 1.

$$SR=(B-A)*100/A \quad \text{(formula 1)}$$

The maximum stretching rate represents a largest stretching rate before a crack or a removal is generated in the shaped grid pattern inkjet film 82. The relationship between the calculated stretching rate and a stereoscopic effect, when the indicator panel 1 is used for an automobile meter panel, is shown in FIG. 14. The stereoscopic effect is evaluated based on results of sensory evaluations when a driver looks at the indicator panel 1 as the automobile meter panel. The evaluation is performed in four levels, i.e., AA, A, B and C, and the stereoscopic effect is better in this order. As shown in FIG. 14, the stretching rate equal to or more than 50% may be required for the indicator panel 1 in order to obtain the level A. If the rate SR is less than 50%, the stereoscopic effect is insufficient such that the thermoforming process may be in vain.

The design film 2 may have a thickness equal to or less than 100 μm. Further, the UV hardening ink for forming the design film 2 may include monofunctional monomers equal to or more than 50 wt %. In this case, the maximum stretching rate of the design film 2 can be improved such that a crack and a removal of the design film 2 can be more reduced when the panel 1 is thermoformed. Moreover, the panel 1 can be formed in a larger stretching rate so as to be formed in more stereoscopic.

Figure 7:
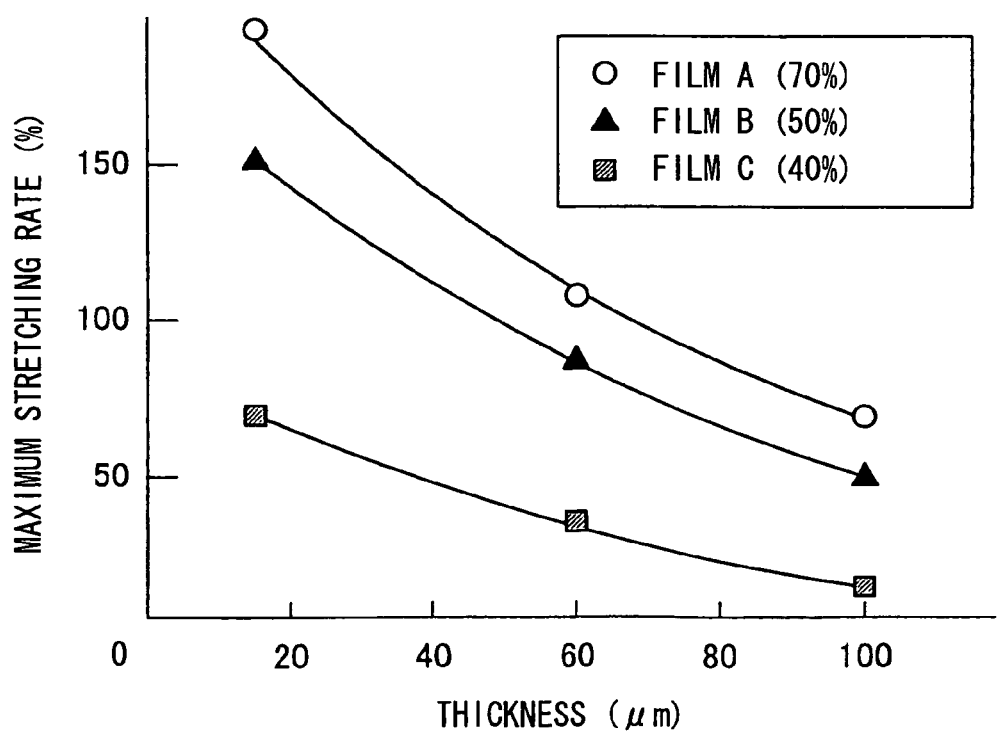
FIG. 7 is a graph showing a relationship between a maximum stretching rate and a thickness of an inkjet design film, and a relationship between the maximum stretching rate and an amount of monofunctional monomers.

A relationship between the thickness of the film 2 and the maximum stretching rate, and a relationship between the ratio of the monofunctional monomers to the ink used for forming the film 2 and the maximum stretching rate are described with reference to FIG. 7. In FIG. 7, plural UV hardening inks having different ratios of the monofunctional monomers are used for forming the films 2, and plural films 2 having different thicknesses are formed. The maximum stretching rates are measured in the above-described method. In FIG. 7, FILM A is formed using the ink having 70 wt % of monofunctional monomers, FILM B is formed using the ink having 50 wt % of monofunctional monomers, and FILM C is formed using the ink having 40 wt % of monofunctional monomers. As shown in FIG. 7, the maximum stretching rate is increased when the thickness is decreased, and when the ratio of the monofunctional monomers is increased.

In addition, a part of the design film 2 stretched at a higher stretching rate in the thermoforming time may be formed in a larger thickness. In this case, a lowering of the transmission density due to a decrease of the thickness can be reduced in the part. The indicator panel 1 is shaped by thermoforming the indicator panel portion 19 including the substrate 15 and the design film 2. At this time, because a part of the design film 2 is stretched at the higher stretching rate, the thickness of the part becomes thinner after the stretching. For example, the opaque portion 27 may be not formed in the part having the high stretching rate, because the transmission density is lowered due to the thinned thickness after the thermoforming. The lowering of the transmission density can be reduced by enlarging the thickness of the design film 2 having the higher stretching rate.

The resin substrate 15 may be formed of any thermoplastic resins having a transparency, e.g., polycarbonate and polyethylene terephthalate (PET). For example, the substrate 15 may be formed of polycarbonate in this embodiment. In this case, the indicator panel 1 can be used more suitably in the backlight such that most of the brightness from the backlight can be transmitted, because the polycarbonate has a good transparency. Accordingly, the translucent portion 21 can be displayed more clearly.

Further, because the polycarbonate has a good thermoforming (tensile stretching) property, the indicator panel 1 stretched at a higher stretching rate can be manufactured. Therefore, the stereoscopic effect of the panel 1 can be more improved. Furthermore, the substrate 15 made of the polycarbonate has a high adhesion to the ink.

Moreover, from a viewpoint of the stretching, the thickness of the substrate 15 made of the polycarbonate may be 0.3-1.0 mm. The thickness may be 0.5 mm in this embodiment. This is because the substrate 15 is easy to be broken in a thinner thickness, and the substrate 15 is easy to be cracked in a thicker thickness due to a high curvature.

Further, an extrusion sheet forming is general for manufacturing the substrate 15 made of the polycarbonate. However, a large residual stress is easy to be generated in the stretching direction of the resin such that a large variation in dimension of the design film 2 is easy to be generated when the indicator panel 1 is thermoformed, e.g., pressing. Therefore, a narrow side direction of a design printed on the substrate 15 may be positioned corresponding to the extrusion stretching direction in the inkjet printing. Thus, a contraction by the heating can be decreased such that a stability in dimension of the design film 2 can be improved. The narrow side direction represents a narrowest direction of the design formed in the inkjet printing.

For example, the design film 2 having a printing resolution equal to or more than 600DPI may be formed by the inkjet printing having equal to or more than four passes. In this case, a predetermined design can be formed in sharp and accurate.

The unit of the "pass" will be described below. Normally, in the inkjet printing, a forwarding dimension of the substrate 15 to be printed is made to be smaller than a width of an inkjet head. The inkjet printing is performed by plural scanning on the same place in order to form a high-resolution design. Here, the number of the scanning is defined as the "pass". In the inkjet printing, if the discharging direction of the ink is slightly changed such that an error is generated, the quality of the design film 2 is much affected. For example, a part of the design film 2 may be faint, when the plural scanning is not performed, that is, when one pass printing is performed. Further, when the design film 2 is printed on the resin substrate 15, the ink does not penetrate the resin substrate 15, which is different from a case in which the ink penetrates a paper substrate. Therefore, a concave and convex, and a streak of the design film 2 may be more emphasized, when the scanning number (pass) is small. In order to avoid this, the above plural scanning equal to or more than four passes is performed such that a predetermined design can be formed in more accurate.

An example of appearance evaluations in accordance with the pass number is described below. Design films 2 in black solid are formed on the substrate 15 at the resolution of 600DPI while changing the number of the pass in the inkjet printing. Afterward, the appearances of the design films 2 are evaluated. Specifically, in order to achieve the resolution of 600DPI, four passes of an ink head having 150DPI resolution, two passes of an ink head having 300DPI resolution, and one pass of an ink head having 600DPI resolution are performed. Then, a presence or absence of an ink streak and an ink bending is evaluated at a connecting portion of the passes. The evaluation is performed by comparing with a solid printing by a screen-printing. The results are shown in FIG. 15. In FIG. 15, A represents a good appearance similar to that by the screen-printing, B represents an appearance having slightly more streak and bending compared with that by the screen-printing, and C represents a bad appearance having an evident streak and bending compared with that by the screen-printing. As shown in FIG. 15, equal to or more than four passes may be performed in order to improve the quality of the appearance of the design film 2.

The design film 2 may be formed by jetting droplets of the UV hardening ink in the inkjet printing and hardening such that the volume of the droplets is equal to or less than 30 pl. In this case, a transudation of the ink can be reduced when the ink is jetted to the substrate 15 in the inkjet printing. Accordingly, the design film 2 can be formed in more sharp.

Furthermore, the design film 2 may be formed on the back face 152 of the substrate 15 opposite to the design face 151. As shown in FIG. 2, especially when the opaque potions 27, 28 are formed on both the faces 151, 152, the thickness of the design film 2 for forming the opaque portions 27, 28 can be reduced. A specified or more thickness is usually required for forming the opaque portions 27, 28. However, when the design film 2 in black is formed on the both faces 151, 152 like sandwiching the substrate 15, for example, the thickness of the design film 2 for forming the opaque portions 27, 28 can be decreased.

Figure 8:
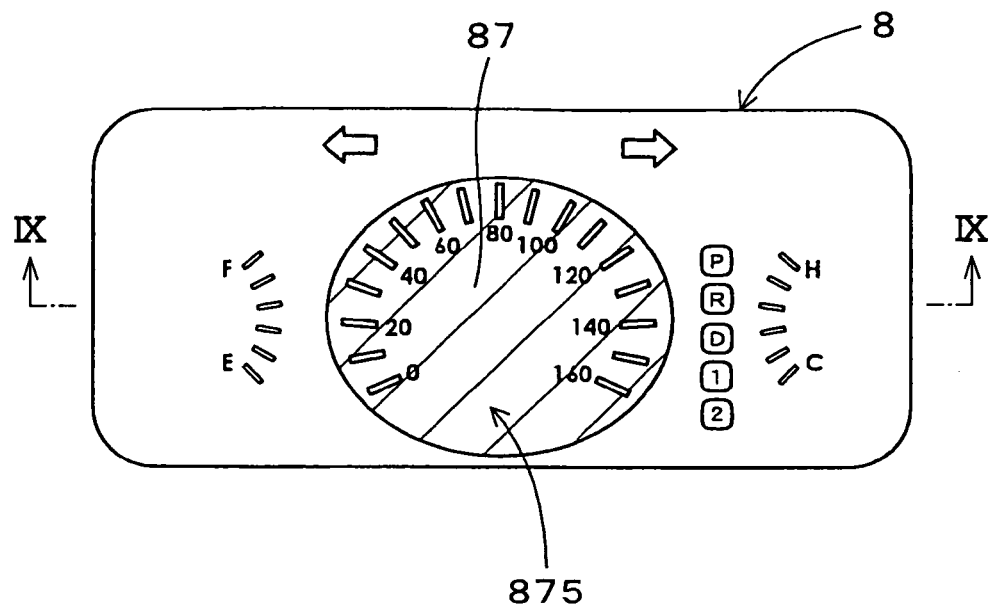
FIG. 8 is a front view of an indicator panel having an inkjet design film and a screen design film.
Figure 9:
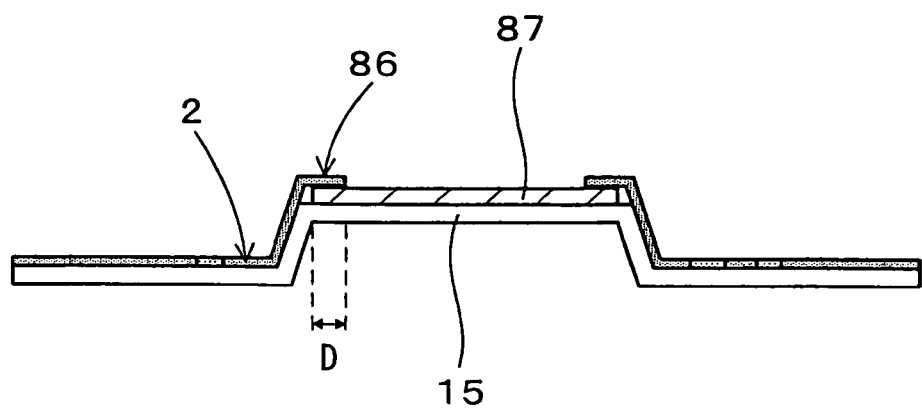
FIG. 9 is a schematic cross-sectional view of the indicator panel taken along line IX-IX in FIG. 8.

A screen design film 87 shown in FIGS. 8, 9 other than the inkjet design film 2 may be formed on the design face 151 of the substrate 15, and the screen design film 87 may be made by a screen-printing. As shown in FIG. 9, the end portions of the inkjet design film 2 and the screen design film 87 may be overlapped with each other so as to form a lap portion 86 such that the lap portion 86 has a width D equal to or more than 0.1 mm. When the screen design film 87 and the inkjet screen design film 2 are formed on the substrate 15 by the screen-printing and the inkjet printing, a displacement is easy to be generated at the boundary of the films 2, 87. The displacement can be reduced by forming the lap portion 86 as described above.

An example of an automobile instrument panel using the screen design film 87 is shown in FIG. 8. A design 875 for forming a speed meter is formed of the screen design film 87 approximately in the center area of the substrate 15 in an indicator panel 8. The other design except for the speed meter is formed of the inkjet design film 2. The lap portion 86 is formed at the boundary of the films 2, 87 in the indicator panel 8, at which the end portions of the inkjet design film 2 and the screen design film 87 are overlapped on each other. When the lap portion 86 has the width D equal to or more than 0.1 mm, the displacement at the boundary can be reduced.

Figure 10:
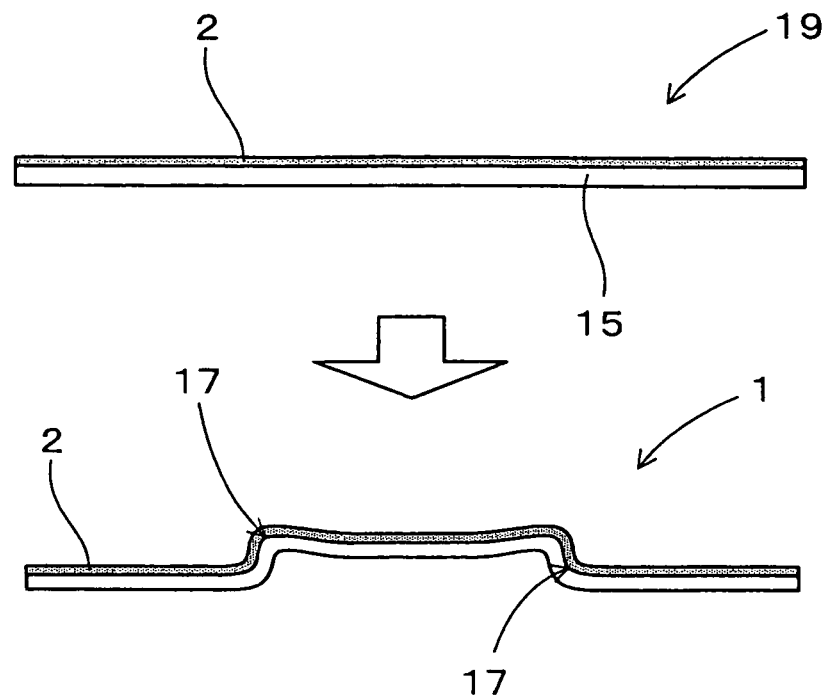
FIG. 10 is a schematic cross-sectional view showing a method of manufacturing an indicator panel having a high stretching portion by thermoforming.

Furthermore, as shown in FIG. 10, the shaped indicator panel 1 may include a high stretching portion 17 thermo-formed at a stretching rate equal to or more than 100%. The screen design film 87 may be formed in the stretching portion 17 by the screen-printing, in which a silk ink is coated and hardened. In this case, a crack and a removal at the high stretching portion 17 can be more reduced.

Figure 11:
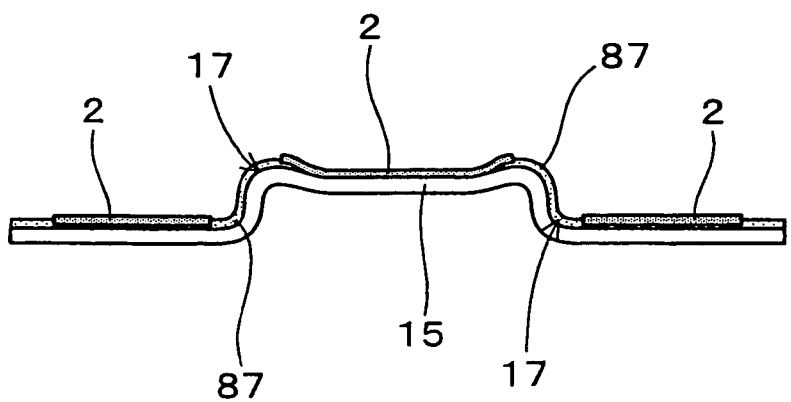
FIG. 11 is a schematic cross-sectional view of an indicator panel having a screen design film in a high stretching portion.

For example, as shown in FIG. 10, the indicator panel 1 is formed by heating the indicator panel portion 19 including the resin substrate 15 and the inkjet design film 2 formed on the substrate 15 by printing and hardening. When the panel 1 has the high stretching portion 17, a crack and a removal of the design film 2 are easy to be generated at the high stretching portion 17. The high stretching portion 17 is formed by partially stretching the indicator panel portion 19 at the high stretching rate equal to or more than 100%. Then, as shown in FIG. 11, the screen design film 87 is formed at the high stretching portion 17 such that a crack and a removal at the high stretching portion 17 can be more reduced.

The indicator panel 1 may include a high stretching portion 17 thermoformed at the stretching rate equal to or more than 100%. The inkjet design film 2 may be formed in the high stretching portion 17 by printing the ink in the inkjet printing and hardening such that the film 2 has a printing density equal to or less than 50%. In this case, a crack and a removal of the design film 2 at the high stretching portion 17 can be more reduced.

Figure 12:
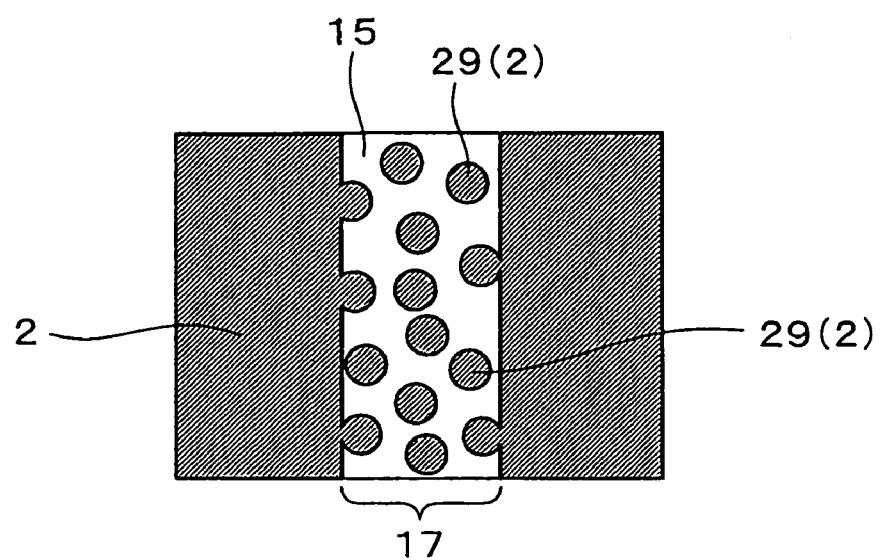
FIG. 12 is an enlarged view of a high stretching portion of an inkjet design film having a low printing density.

As shown in FIG. 12, at the high stretching portion 17, the inkjet film 2 can be formed as a mass of dots 29 printed on the substrate 15 such that the film 2 has the printing density equal to or less than 50%. By decreasing the printing density at the high stretching portion 17, the maximum stretching rate of the inkjet design film 2 can be more improved such that a crack and a removal at the high stretching portion 17 can be more reduced.

A part of the inkjet design film 2 may be coated with an overcoat film having a pencil hardness equal to or more than HB and a maximum stretching rate equal to or more than 50%. In this case, the inkjet design film 2 can have a matted effect. Moreover, the endurance property of the film 2 can be improved because the surface of the film 2 can be protected although the surface of the film 2 is relatively soft and easy to be damaged. When the pencil hardness of the overcoat film is less than HB, the endurance property of the film 2 may not efficiently be improved. Further, when the maximum stretching rate is less than 50%, a crack and a removal of the overcoat film may be generated in the thermoforming. The overcoat film may be formed by the silkscreen printing or the inkjet printing using a transparent ink, for example.

The overcoat film may be formed by the silkscreen printing. A silkscreen ink used for the silkscreen printing is not required to lower the viscosity, which is different from the ink used for the inkjet printing. Therefore, the silkscreen ink is suitable for forming the overcoat film, because the silkscreen ink can be coated thickly. For example, the thickness of the overcoat film is formed in 5-50 μm.

When the inkjet design film 2 is formed by the inkjet printing, a part of the thickness may be too thick like an oil painting, in which the ink volume is large. If the overcoat film having a predetermined thickness is coated on the entire face of the design film 2, the appearance quality of the design film 2 may be improved, because the thickness does not seem to be too thick. Further, a stress distribution generated by the difference of the ink volume in the design film 2 can be decreased such that the endurance property is improved. The stress distribution is generated when the ink is contracted by hardening. Furthermore, when an additive such as inorganic fillers, e.g., silica or acrylic beads, organic fillers or a delustering agent is added into the overcoat film, the surface hardness can be controlled, and the appearance can be improved so as to have a special texture on the surface.

The overcoat film may be formed on the inkjet design film 2 by printing the ink in the inkjet printing and hardening. Thus, the overcoat film having a fine pattern can be formed by using the high resolution of the inkjet printing. The matted effect and the special texture can be formed on the overcoat film in a partial or total variation. Another overcoat film can be formed by the inkjet printing on the overcoat film formed by the screen-printing.

After a half-hardened design film is formed on the substrate 15 by repeating a jetting process and a half-hardening process, the design film 2 may be formed by performing a thermoforming process and a hardening process to the half-hardened design film. In the jetting process, the droplets of the ink are jetted to the substrate 15. In the half-hardening process, the ink is hardened by radiating ultraviolet rays such that a ratio of remaining monomers to the jetted ink is set in a range between 20 wt % and 80 wt %. In the thermoforming process, the substrate 15 is formed by heating. In the hardening process, the design film 2 is formed by radiating ultraviolet rays to the half-hardened design film. Thus, the maximum stretching rate of the design film 2 can be more improved at the thermoforming process. Therefore, a crack and a removal of the design film 2 can be more reduced at the thermoforming process. Moreover, a drawing process can be performed at a higher stretching rate in the thermoforming process.

That is, the half-hardened design film having 20-80 wt % of the monofunctional monomers can be formed on the substrate 15 by repeating the jetting process and the half-hardening process. The half-hardened design film has a high maximum stretching rate. Therefore, a crack and a removal of the design film 2 are difficult to be generated when the substrate 15 is thermoformed at the high stretching rate in the thermoforming process, in which the half-hardened design film is printed on the substrate 15. After the thermoforming process, ultraviolet rays are radiated to the half-hardened design film again in the radiating process such that the indicator panel 1 is formed. For example, the design film 2 of the panel 1 is hardened so as to have a ratio of the monofunctional monomers equal to or less than 10 wt % in the radiating process.

Furthermore, the ultraviolet rays may be radiated in the hardening process such that the design film 2 has the ratio of the remaining monofunctional monomer component equal to or less than 5 wt %. Thus, the endurance property of the design film 2 can be improved because the hardness of the design film 2 after the hardening process can be increased.

Such changes and modifications are to be understood as being within the scope of the present invention as defined by the appended claims.

What is claimed is:

1. An indicator panel comprising:
   a translucent resin substrate having a first surface and a second surface opposite to the first surface, the translucent resin substrate being shaped to include a convex portion protruding from a side of the second surface to a side of the first surface;
   a resinous design film that includes a translucent portion through which visible light is transmitted and an opaque portion which does not transmit visible light, the resinous design film being attached to the first surface of the translucent resin substrate including the convex portion; and
   a light source located at a side of the second surface of the translucent resin substrate to transmit light through the translucent portion when illuminated,
   wherein the resinous design film is made of a mass of a plurality of droplets, the droplets adjacent to each other being in contact with each other in the mass so as to form a contact interface between adjacent droplets, and
   wherein the portion of the resinous design film attached to the convex portion is provided with a speed meter.

2. The indicator panel according to claim 1, wherein: the opaque portion has a visible light transmission density equal to or more than 2.0.

3. The indicator panel according to claim 1, wherein: the opaque portion includes a black color layer which is stacked on the translucent resin substrate.

4. The indicator panel according to claim 1, wherein: at least a part of the design film has a maximum stretching rate equal to or more than 50% in the convex portion.

5. The indicator panel according to claim 1, wherein: the design film has a thickness equal to or less than 100 μm.

6. The indicator panel according to claim 1, wherein: the design film is made of a resin that includes monofunctional monomers equal to or more than 50 wt %.

7. The indicator panel according to claim 1, wherein: the resin substrate is made of polycarbonate.

8. The indicator panel according to claim 1, wherein: the plurality of droplets of the design film are massed in a printing resolution equal to or more than 600 DPI.

9. The indicator panel according to claim 1, further comprising:
   another design film on the second face of the substrate opposite to the first face.

10. The indicator panel according to claim 1, further comprising:
    a screen design film on the first face of the substrate, wherein
    the screen design film is a design film different from the resinous design film, and
    the resinous design film and the screen design film are overlapped with each other at an edge thereof to form an overlapped portion.

11. The indicator panel according to claim 10, wherein: the overlapped portion has a dimension equal to or more than 0.1 mm.

12. The indicator panel according to claim 1, further comprising:
    an overcoat film coated on at least a part of the inkjet design film, wherein
    the overcoat film has a pencil hardness equal to or more than HB and a maximum stretching rate equal to or more than 50%.

13. The indicator panel according to claim 1, wherein the translucent resin substrate including the convex portion has approximately a uniform thickness.

14. The indicator panel according to claim 7, wherein the resinous substrate has a thickness of 0.3-1.0 mm.

15. The indicator panel according to claim 14, wherein the resinous substrate has a thickness of 0.5 mm.

* * * * *